J. E. PEDERSEN.
SHAKING MECHANISM FOR FILTERING APPARATUS.
APPLICATION FILED DEC. 13, 1920.

1,388,294.

Patented Aug. 23, 1921.
3 SHEETS—SHEET 1.

Inventor.
John Edwin Pedersen,
by his Attorneys.

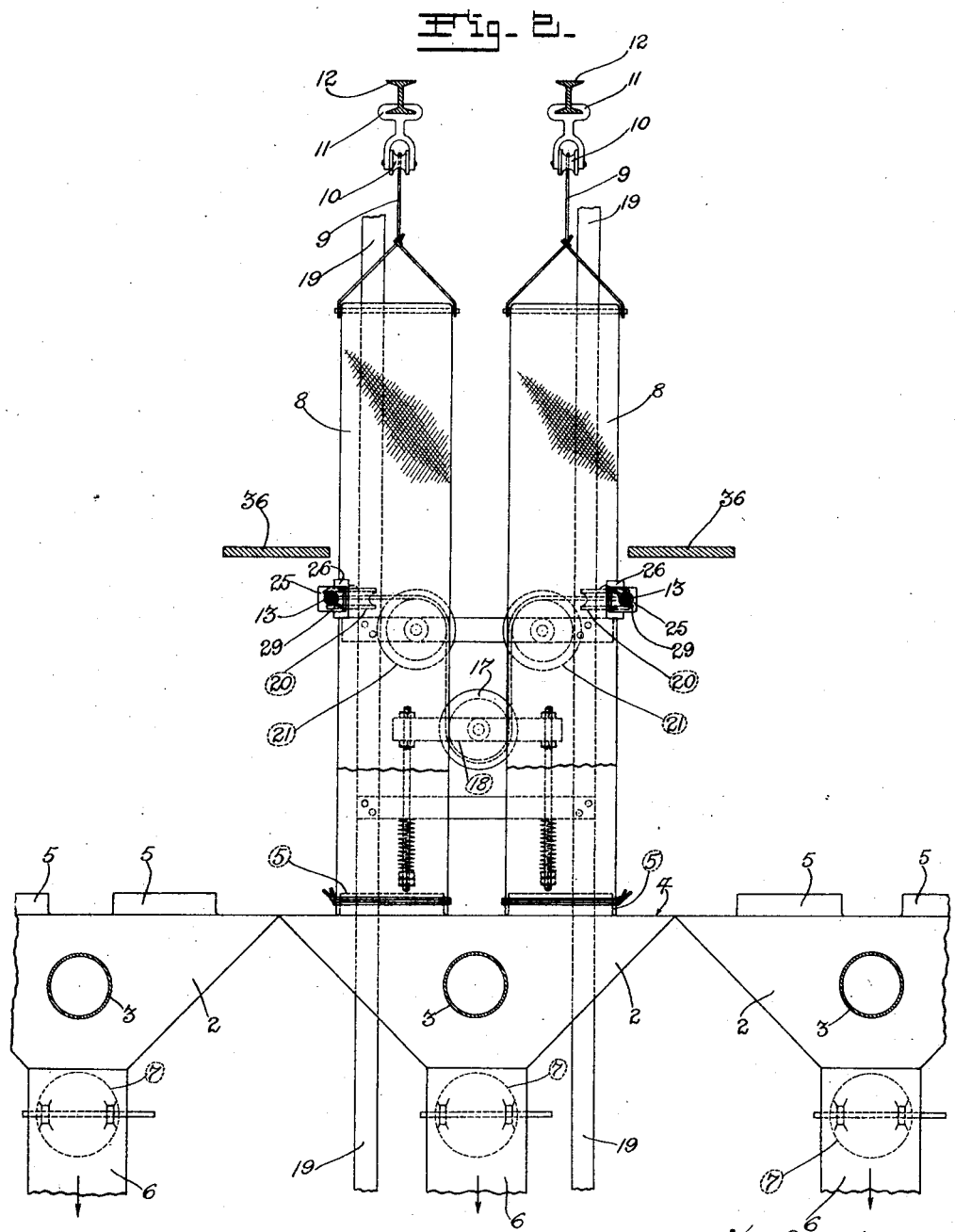

J. E. PEDERSEN.
SHAKING MECHANISM FOR FILTERING APPARATUS.
APPLICATION FILED DEC. 13, 1920.
1,388,294.
Patented Aug. 23, 1921.
3 SHEETS—SHEET 3.
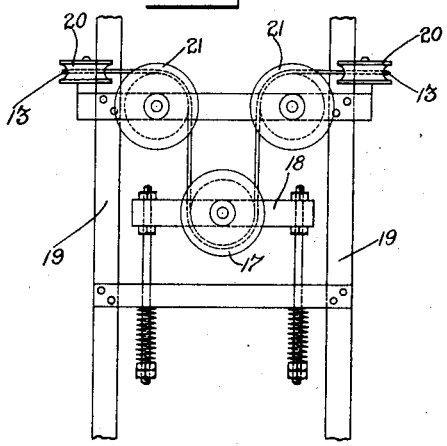
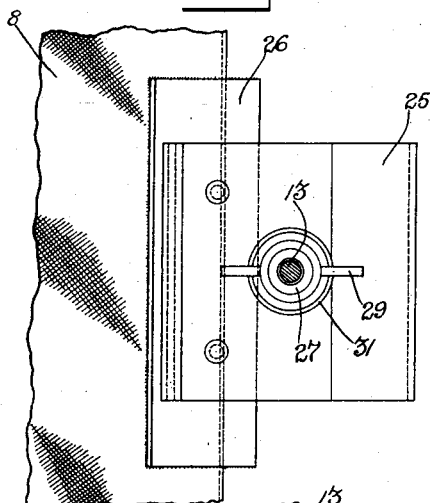
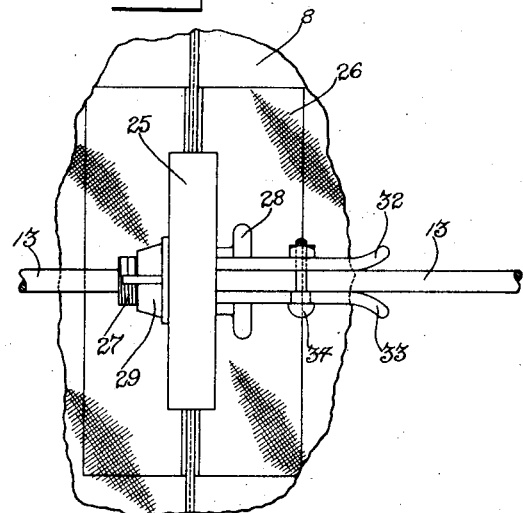
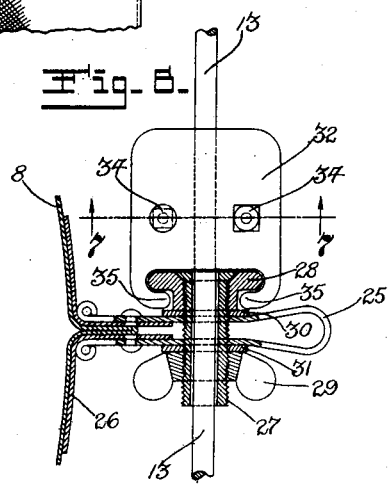
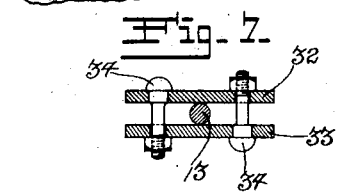
Inventor.
John Edwin Pedersen,
by Pepper & Kingsland.
His Attorneys.

UNITED STATES PATENT OFFICE.

JOHN EDWIN PEDERSEN, OF HILLSBORO, ILLINOIS, ASSIGNOR TO AMERICAN ZINC, LEAD & SMELTING COMPANY, OF ST. LOUIS, MISSOURI, A CORPORATION OF MAINE.

SHAKING MECHANISM FOR FILTERING APPARATUS.

1,388,294.           Specification of Letters Patent.     Patented Aug. 23, 1921.

Application filed December 13, 1920. Serial No. 430,559.

*To all whom it may concern:*

Be it known that I, JOHN EDWIN PEDERSEN, a citizen of the United States, residing at Hillsboro, Montgomery county, Illinois, have invented a new and useful Shaking Mechanism for Filtering Apparatus, of which the following is a specification.

This invention relates to a bag shaking mechanism for filtering apparatus, and consists in the novel construction hereinafter disclosed.

In order that the purpose of the present invention may be more clearly understood it is necessary to describe briefly the general system in which it is embodied. In the manufacture of the zinc oxid the zinc ore is mixed with a suitable fuel and burned in a furnace. The products of combustion pass from the furnace into a combustion chamber where they are more thoroughly burned and pass off in a volatile state from the combustion chamber into a cooling tube or trail. The zinc oxid is entrained with the products of combustion and as the gas carrying the zinc oxid leaves the combustion chamber, at a high temperature, it passes into the cooling tube or trail and is cooled in its passage through the tube. The gas is drawn from the end of the cooling tube remote from the combustion chamber by a suction fan and discharges into a conduit which has manifold branches discharging into hoppers arranged in parallel series in what is commonly termed the bag house. A large number of bags, arranged in parallel series, are connected over outlet flues in the top wall of the hoppers. These bags are suspended at the top upon a rope or cable. The gas enters the bags which are of porous material and filters through the walls thereof, leaving on the inner surface of the bags the residue of zinc oxid. The residue accumulates comparatively rapidly so that at intervals it is necessary to shake or agitate the bags to dislodge the zinc oxid from the bags and discharge it into the hopper therebelow. Heretofore, in practice, the bags have been manually shaken by an operator traversing platforms arranged adjacent to each series of bags. The manual shaking of the bags has required much labor and, in addition thereto, the work has been quite injurious to the operator for the reason that it is necessary, under the present practice, for the operator to remain for an extended period of time within the bag house which is permeated with fumes from the gas filtering through the bags.

The object of the present invention is to provide a mechanical bag shaking mechanism adapted to control the shaking of the bags at intervals, and whereby the bags are simultaneously agitated by imparting thereto a limited rotary motion.

Additional advantageous features of the invention will be apparent from the following detailed description taken in connection with the accompanying drawings, in which the details of the particular improvement of the invention, as well as part of the associated mechanism, are illustrated.

In the drawings, Figure 1 is a plan view of a section of the bag house illustrating the mechanism of the present invention applied to one unit of bags.

Fig. 2 is a view, in vertical elevation, further illustrating the invention.

Fig. 3 is a detailed view of the cable tension means which is a part of the mechanism of the present invention, said view being taken substantially on the line 3—3 of Fig. 1.

Fig. 4 is a vertical elevation illustrating the details of the connecting means for attaching the bags to the cable.

Fig. 5 is a view of the same structure illustrated in Fig. 4, taken at an angle of 90 degrees.

Fig. 6 is a plan view partially in section of the same connecting means.

Fig. 7 is a sectional view on the line 7—7 of Fig. 6.

Figure 1:
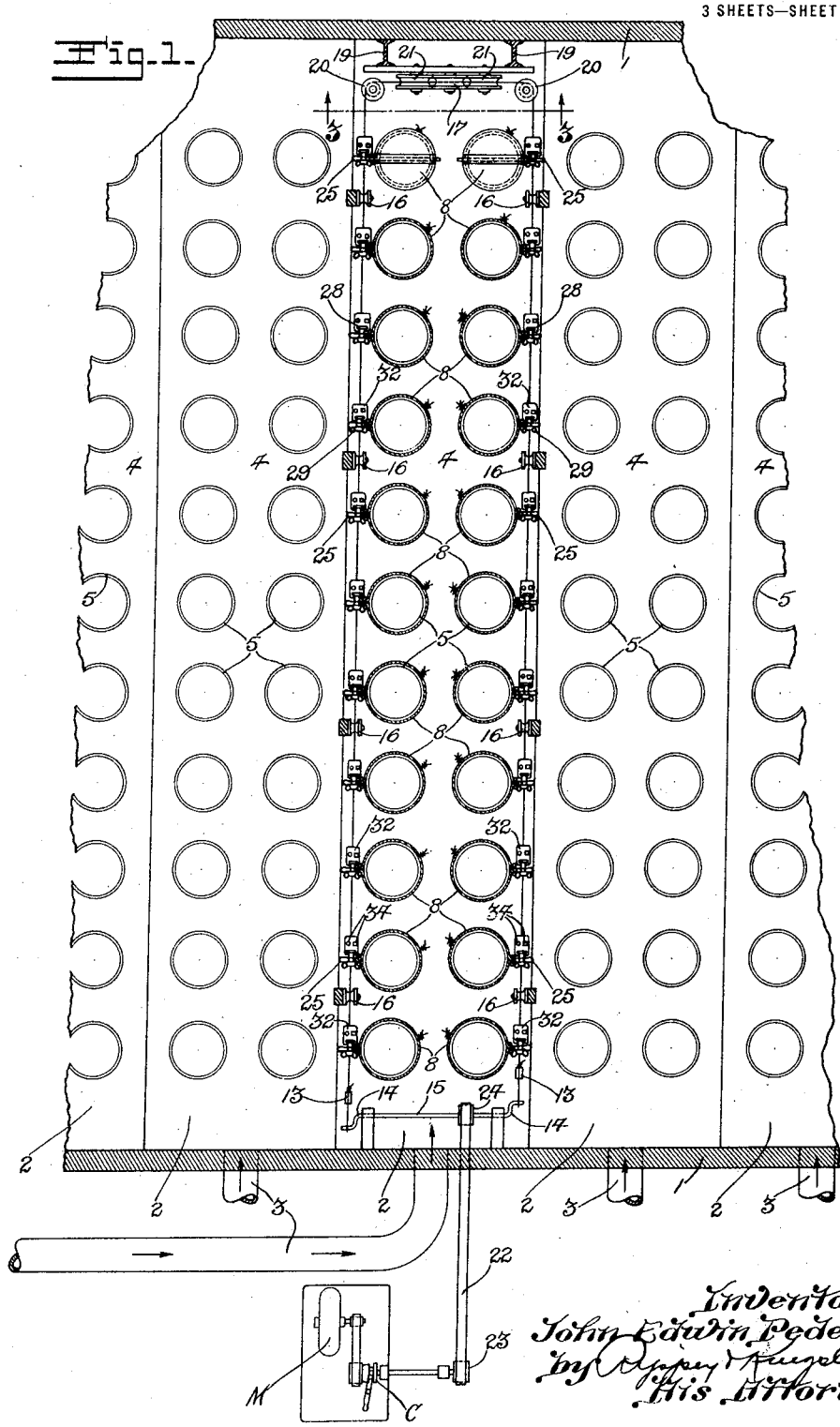

In Fig. 1 of the drawing, 1 indicates the walls of the bag house. The bag house merely constitutes an inclosure for the filtering apparatus. In the bag house is arranged a series of hoppers 2 disposed preferably in parallel alinement. The pipes 3 represent the branches from the discharge conduit of the suction fan, said pipes 3 discharging into one end of the corresponding hopper. The hoppers are closed by top walls 4, said walls 4 being provided with parallel series of openings which discharge into flues 5. The hoppers are elevated above the floor of the bag house and have suitable discharge conduits 6 in the bottom thereof, said discharge conduits being controlled by gates 7. The hoppers are so constructed that they are substantially gas tight, except at the discharge openings into the flues 5. Over each flue is supported a tube or bag 8, each of said bags being suspended from a cable or rope 9 operating over a pulley 10 carried by a support 11 mounted on cross beams 12 which are in turn supported by the walls of the bag house, or on suitable standards. Thus it will be evident that the products of combustion, discharged from the discharge conduit of the suction fan, will be forced into the series of hoppers and from the hoppers forced into the bags suspended above the flues 5. It is to be understood that the bags 8 are of porous material so that as the gas is forced out through the interstices in the walls thereof, the entrained residue of zinc oxid will be caught by and accumulated upon the inner surface of the bag.

The particular mechanism of the invention includes a cable 13 having its opposite end attached to opposed crank arms 14 formed at each end of a shaft 15, the shaft 15 being journaled transversely of each bag unit comprising parallel pairs of bags. The cable 13 is supported by a series of pulleys 16 arranged on opposite sides and, in order to maintain the cable under proper tension, the cable loops over a pulley 17 carried by a spring actuated bar 18 arranged in a support 19 at one end of each of the hoppers. Guide pulleys 20 and 21 are so disposed as to preserve the alinement of the cable and to guide the loop or turn in the cable so that it may engage over the pulley 17. The shaft 15 is driven from a motor M, provided with a suitable clutch C, by a belt connection 22 operating over a pulley 23 on the power shaft of the motor and a pulley 24 on the shaft 15. It is preferable that the motor be located exteriorly of the bag house so that it can be controlled by an operator without being exposed to the gas fumes accumulated in the bag house. It will be understood that as the shaft 15 is revolved the cable 13 will oscillate.

The cable is connected with each of the bags by a novel form of connection specially designed for the purpose. This connection comprises a leaf spring 25 which has a layer of pliable material 26, such as lambs' wool or other substance that will not injure the bag wall, attached to the inner face of the jaws of the spring. In each of the leaves of the spring 25 there is an opening into which is fitted an exteriorly threaded nipple 27, the nipple 27 carrying a thimble 28 at one end and a thumb nut 29 at the opposite end. A washer 30 is interposed between the face of the thimble 28 and the outer face of one of the leaves of the spring 25, and a washer 31 is interposed between the inner face of the thumb nut 29 and the outer face of the other leaf of the spring 25.

In attaching the spring clamp to the bag a portion of the wall thereof is pinched between the jaws of the spring 25 and the thumb nut tightened to clamp the spring in contact with the bag, it being understood that the protecting layer 26 is intermediate the face of the spring clamp and the bag so as to protect the bag from injury.

The cable passes through the nipple 27 and is connected with the clamp construction by a clevis comprising a plate 32 and a plate 33 bolted together by bolts 34. The plates 32 and 33 have jaws 35 that engage over the flange of the thimble 28, thereby providing a swivel connection between the clevis and the clamping device. This is necessary for the reason that there is a slight vertical movement of the bags, due to the different degrees of inflation or deflation, and also to provide for a twisting motion in the cable.

It will be noted that the cable is supported at an elevation approximately midway of the length of the bags 8. Above the cable are platforms 36 provided for an operator in making adjustments of the connecting devices.

From the foregoing it will be understood that at proper intervals power may be applied to the shaft 15, thereby actuating the shaking mechanism which imparts a limited rotary motion to each of the bags of the series, sufficiently agitating them to dislodge the residue accumulated on the inner face thereof, which residue discharges directly into the hoppers through the flues 5, from whence it may be withdrawn through the discharge conduits 6 which are controlled by the gates 7.

I am aware that the structure may be modified in certain particulars without departing from the spirit and scope of the invention. I do not limit myself therefore to the exact construction and arrangement shown and described, but what I claim and desire to secure by Letters Patent, is:—

1. In mechanism of the class described, the combination of a gas-tight hopper, an outlet flue from the hopper, a vertically suspended bag having its lower end connected to the wall of said flue, a device connected with the walls of the bag for imparting thereto a torsional shaking motion in opposite directions to dislodge the residue from the walls of the bag and discharge the residue into said flue, and mechanism for operating said device alternately in opposite directions to shake the bag torsionally, as aforesaid.

2. In mechanism of the class described, the combination of a plurality of bags having their upper ends closed, flexible means supporting the closed ends of the bags respectively, elements releasably engaging the walls of the bags, a connection uniting all of said elements, and mechanism for oscillating said connection to impart a torsional shaking motion to the bags.

3. In an apparatus of the class described, the combination of a plurality of bags of pliable material, arranged in double parallel series and having their upper ends closed, flexible elements suspending the bags in upright position, flues opening into the lower ends of the bags respectively, a cable supported near the series of bags, a device in connection with said cable releasably engaging the wall of each of said bags, and mechanism for oscillating said cable to impart a semi-rotary shaking motion to the bags.

4. In an apparatus of the class described, the combination of a plurality of bags, composed of pliable material and having their upper ends closed, flexible means suspending the bags in upright position, flues opening into the lower ends of the bags, an element supported adjacent to the series of bags, releasable members connecting said element with said bags respectively, a device for oscillating said element to impart a torsional shaking motion to the bags, and mechanism for operating the said device.

5. In an apparatus of the class described, the combination of a plurality of bags arranged in double parallel series, said bags being closed at one end, flues communicating with the open ends of said bags, flexible means for supporting the bags in upright position, a cable extending around the series of bags, a shaft, opposed crank arms on said shafts attached to the opposite ends of the cable, and means for revolving the shaft whereby a semi-rotary motion is imparted to the bags for shaking the same.

6. In an apparatus of the class described, a pliable bag, a movable element supported adjacent to the bag, a member releasably engaging the wall of the bag, a pivoted connection between said element and said member, and means for operating said element to impart a torsional shaking motion to the bag.

7. In an apparatus of the class described, the combination with a plurality of pliable bags closed at their upper ends, means for supporting the bags in an upright position, of members releasably engaging the bags, means for holding said members in engagement with the bags, a movable element, a releasable connection between said element and each of said members, and mechanism for operating said element to impart a torsional shaking motion to the bags.

8. In an apparatus of the class described, a plurality of pliable bags, a cable supported adjacent to the bags, releasable elements engaging the bags, and a pivoted connection between the cable and each of said releasable elements for imparting a torsional shaking motion to the bags by the movement of the cable.

JOHN EDWIN PEDERSEN.